United States Patent [19]
Vanderjagt

[11] Patent Number: 5,168,897
[45] Date of Patent: * Dec. 8, 1992

[54] QUICK AND DRY COUPLING
[75] Inventor: John A. Vanderjagt, Memphis, Tenn.
[73] Assignee: Ingersoll-Rand Company, Woodcliff Lake, N.J.
[*] Notice: The portion of the term of this patent subsequent to Jan. 22, 2008 has been disclaimed.
[21] Appl. No.: 829,096
[22] Filed: Jan. 31, 1992

Related U.S. Application Data

[60] Division of Ser. No. 585,923, Sep. 20, 1990, Pat. No. 5,092,363, which is a division of Ser. No. 486,833, Mar. 1, 1990, Pat. No. 4,986,304, which is a continuation-in-part of Ser. No. 466,066, Jan. 16, 1990, abandoned.

[51] Int. Cl.$^5$ ............................................. F16L 37/32
[52] U.S. Cl. ............................ 137/614.02; 137/614.2
[58] Field of Search .......................... 137/614.02, 614.2

[56] References Cited

U.S. PATENT DOCUMENTS

| | | | |
|---|---|---|---|
| 224,256 | 2/1880 | Welch | 137/614.02 |
| 236,388 | 1/1881 | Westinghouse | 137/614.02 |
| 910,579 | 1/1909 | Rath | 137/614.02 |
| 2,393,489 | 1/1946 | Trautman | 137/614.02 |
| 2,457,251 | 12/1948 | Main, Jr. | |
| 2,675,250 | 4/1954 | Paquin | 137/614.02 |
| 4,422,472 | 12/1983 | Klein | 137/614.2 X |
| 4,510,969 | 4/1985 | Rodth | 137/614.04 X |
| 4,844,123 | 7/1989 | Wick | 137/322 |
| 4,986,304 | 1/1991 | Vanderjagt | 137/614.02 |

FOREIGN PATENT DOCUMENTS

| | | |
|---|---|---|
| 1134858 | 8/1962 | Fed. Rep. of Germany . |
| 1956333 | 5/1971 | Fed. Rep. of Germany . |
| 670777 | 4/1952 | United Kingdom . |

Primary Examiner—Gerald A. Michalsky
Attorney, Agent, or Firm—Michael H. Minns

[57] ABSTRACT

A quick and dry coupling for coupling together devices such as fluid lines. One embodiment of the coupling includes a pair of heads in which is provided mating members having mating surfaces for moving the mating members in opposite directions away from one another towards an open position and to permit movement of the mating members towards one another when the pair of mating members are turned in the opposite direction relative to one another, a latch coacting between the heads for selectively being movable to an unlatched position, to an intermediate position, and to a latched position for providing the attached condition of the coupling. Springs are provided for moving the pair of mating members into a closed position in which fluid flow is stopped and the latch is moved from the latched position to the intermediate position. In another embodiment of the coupling the mating members are fixedly held against turning movement relative to one another, and separate cams are respectively operably coupled between the heads and the mating members to cause the mating members to move to an open position upon turning movement of the heads.

16 Claims, 7 Drawing Sheets

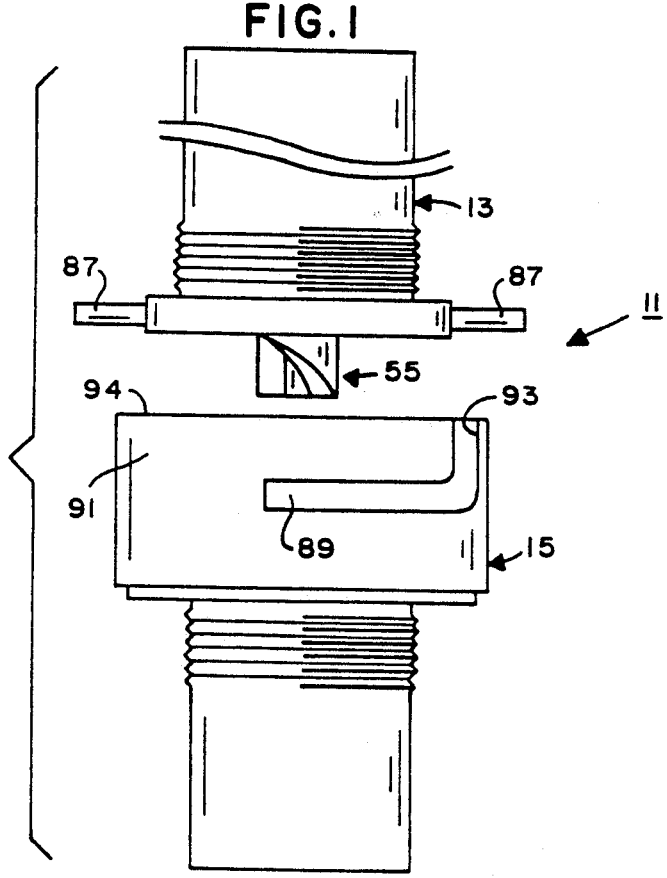
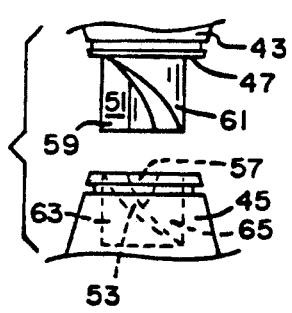
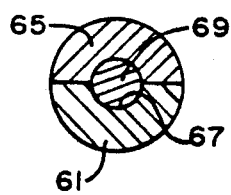
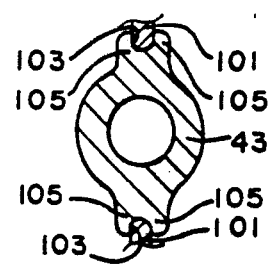
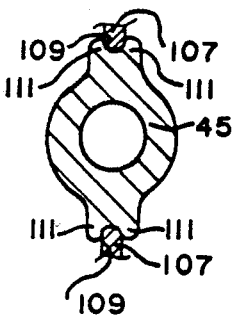

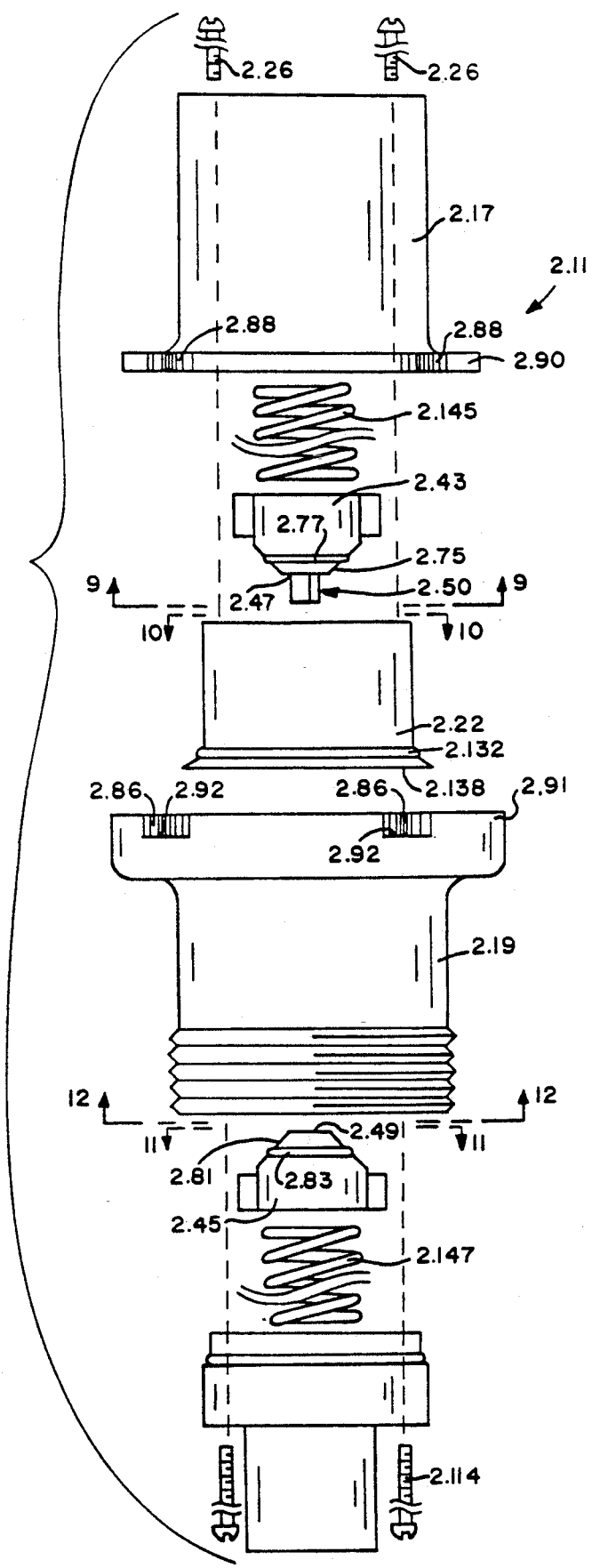

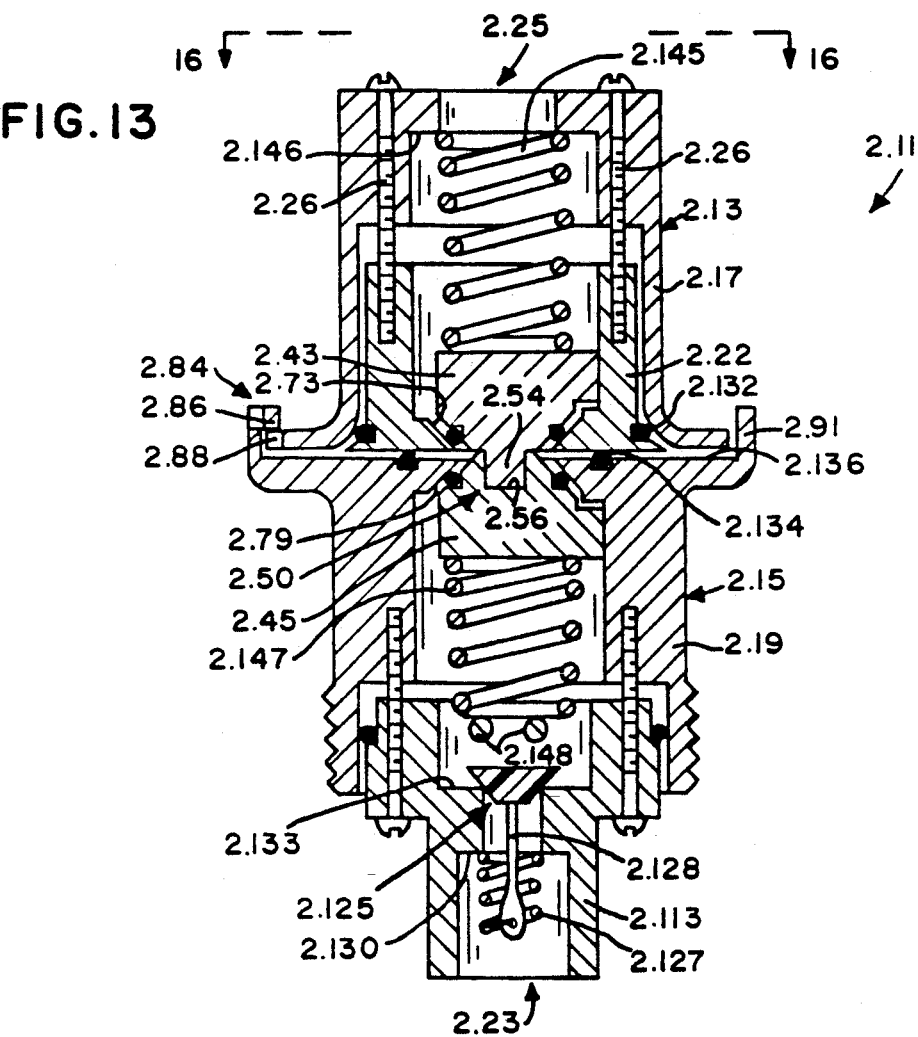
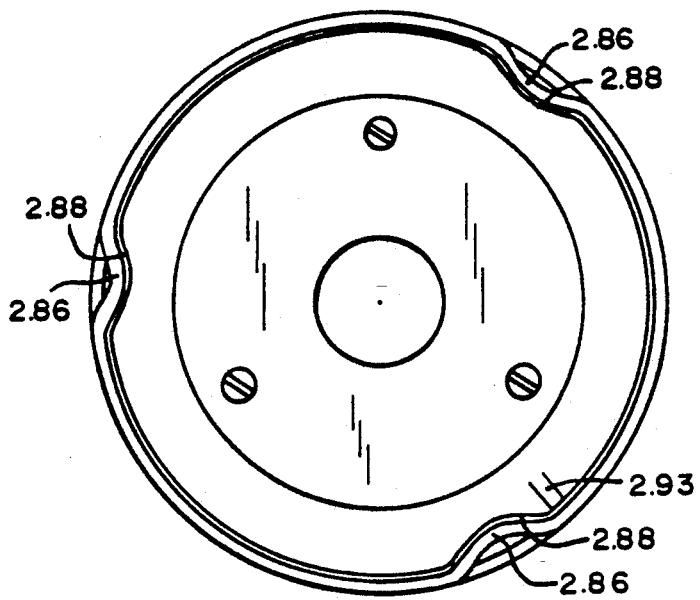

QUICK AND DRY COUPLING

CROSS-REFERENCE TO RELATED APPLICATION

This is a division of application Ser. No. 585,923 filed Sep. 20, 1990, now U.S. Pat. No. 5,092,363, which is a divisional of prior application Ser. No. 486,833, filed on Mar. 1, 1990, now U.S. Pat. No. 4,986,304, which is a continuation-in-part of prior application Ser. No. 466,066, filed on Jan. 16, 1990, now abandoned.

BACKGROUND OF THE INVENTION

1. Field of the Invention

The present invention relates, in general, to fluid line couplings.

2. Information Disclosure Statement

Various fluid line couplings have heretofore been contemplated for connecting and disconnecting the ends of fluid lines. One type of so-called "two-way shut-off coupling" seals both ends of the line against escape of gas or liquid when the coupling is disconnected. The typical coupling of this type includes a sleeve, a plug and a socket. To connect the coupling, the sleeve is pulled back and the plug is pushed in the socket. To disconnect, the sleeve is pulled back to unlock the coupling to seal the ends of the line. There are spring actuated valves in both the socket and plug which engage one another when the coupling is connected to open up the line, and when the coupling is disconnected, the valves seal against seats provided in the socket and plug. In moving from the connected to the disconnected position, the valves are not completely closed when the movement begins so that after the disengagement of the plug and socket dripping can occur from any waste liquid adjacent the proximal ends of the valves before the valves are completely closed. None of the prior devices disclose or suggest the present invention.

SUMMARY OF THE INVENTION

The present invention is directed toward providing an improved fluid line coupling which overcomes previous dripping problems when the couplings are disconnected so that very little, if any, dripping of the fluid takes place.

One of the objects of the present invention is to provide a quick and dry coupling including a pair of head means for being coupled together and in which one of the head means is turned relative to the other to attach and detach the coupling heads relative to one another.

A further object is to provide such a coupling including a pair of mating means respectively provided in the coupling head means, which mating means are movable from an open position when the coupling is attached to an intermediate closed position in which the mating means are completely closed with said movement of the mating means from the open position to the closed position taking place as a result of the turning of the coupling heads relative to one another and before the beginning of the unlatching linear movement of the coupling heads in a direction away from one another.

Another objective of the present invention is to provide such a coupling in which the mating means pushes back all the waste fluid when closing and then completely seals off flow from the head means.

A further object is to provide in such a coupling, a check valve that is self-contained therein as opposed to previous coupling devices in which it was necessary to provide a separate check valve.

A further object is to provide such a coupling which is easy to couple and uncouple with only a partial turn of the head means.

A further object is to provide such a coupling in which a high rate of flow is possible and in which substantially no flow is through the springs that activate the coupling.

A further object is to provide such a coupling which includes a pair of mating means, a pair of helical members and a center post which occupies all of the space at the joint of the mating means so that little, if any, fluid remains that might otherwise drip.

A further object is to provide an alternate embodiment which includes an actuating means including at least one cam means operably coupled between one of the head means and one of the mating means, at least another cam means operably coupled between the other of the head means and the other of the mating means, and a pair of cooperating connecting means respectively provided on the head means for selectively connecting the head means together for limiting turning movement thereof relative to one another, but permitting relative movement towards and away from one another.

BRIEF DESCRIPTION OF THE DRAWINGS

FIG. 1 is an elevational view of a first embodiment of the coupling of the present invention shown in a detached condition.

FIG. 3 is a view similar to FIG. 2 but taken on a vertical plane substantially perpendicular to the plane on which FIG. 2 is taken and showing the coupling of FIG. 1 in an intermediate position of the latching means and an intermediate condition of the coupling.

FIG. 4 is an elevational view of the helix means of the coupling of FIG. 1 shown in a detached condition and shown in connection with certain related structure.

FIG. 5 is a sectional view of the mating means taken as on the line 5—5 of FIG. 3.

FIG. 6 is a sectional view taken as on the line 6—6 of FIG. 3 with parts removed for purposes of illustration.

FIG. 7 is a sectional view taken as on the line 7—7 of FIG. 3 with parts removed for purposes of illustration.

FIG. 8 is an exploded view of a second embodiment of the coupling of the present invention.

FIG. 13 is a sectional view taken as on the vertical plane through the coupling showing the coupling of FIG. 8 in an intermediate condition of the coupling.

FIG. 16 is a top plan view of the coupling of FIG. 8 taken as on the line 16—16 of FIG. 13.

DESCRIPTION OF THE PREFERRED EMBODIMENT

The first embodiment of the coupling 11 of the present invention includes in general a first head 13 and a second head 15.

Figure 2:
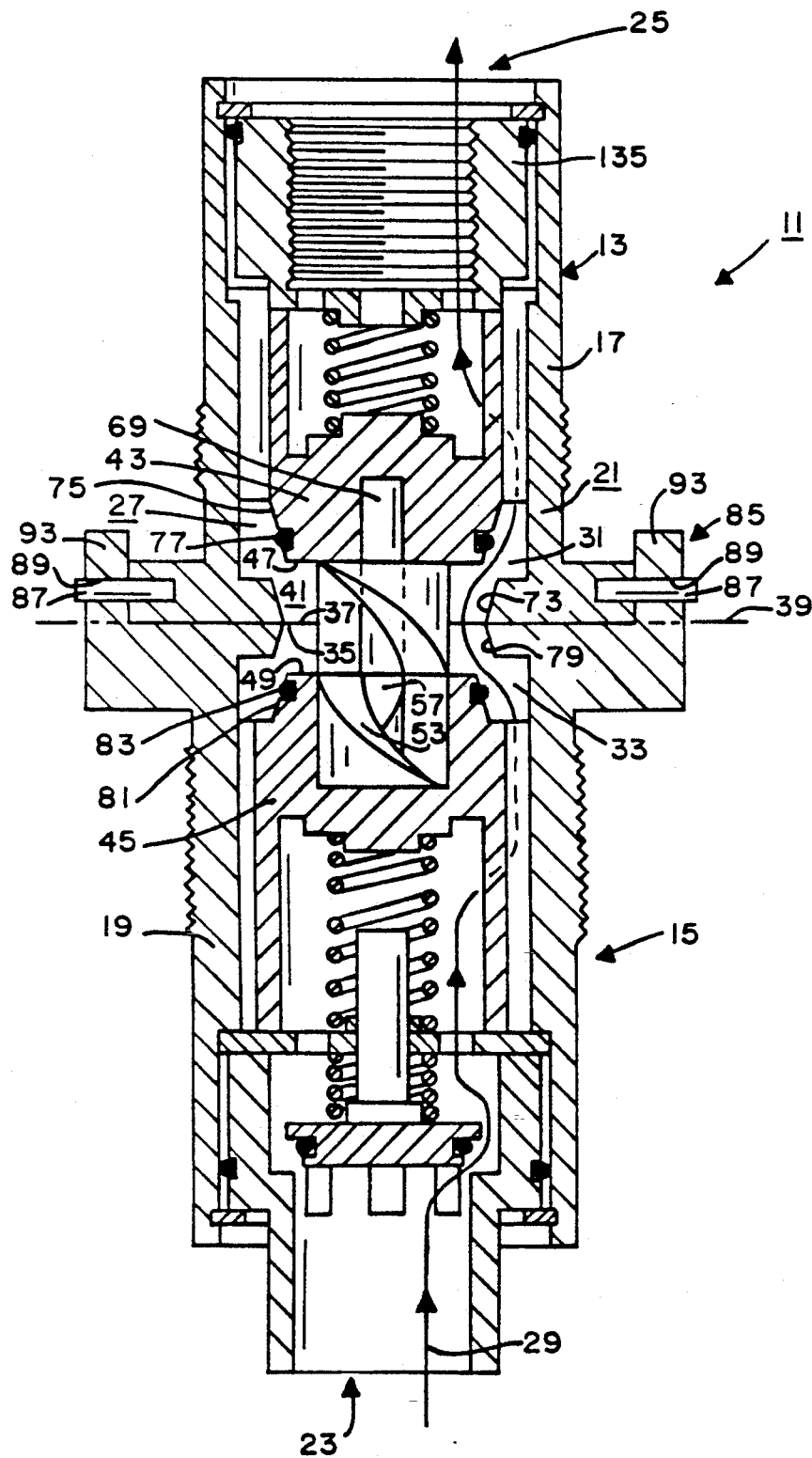
FIG. 2 is a sectional view taken as on a vertical plane through the coupling showing the coupling of FIG. 1 in an attached condition and with certain parts of the coupling being shown in elevation for purposes of illustration.

Coupling 11 is operable between a coupling detached condition shown in FIG. 1 in which heads 13, 15 are detached from one another and an attached condition shown in FIG. 2 in which heads 13, 15 are coupled together.

Heads 13, 15 respectively include body members 17, 19 which, when coupling 11 is in said attached condition, establishes body means 21. Body means 21 has an inlet 23 at one end thereof (i.e., the remote end of head 15) and an outlet 25 at the opposite end thereof (i.e., the remote end of head 13). It will be understood that for the sake of clarity the ends of body members 17, 19 which are joined together when coupling 11 is in said attached condition are herein referred to as the proximal ends of body members 17, 19, whereas the opposite ends of the body members are referred to as the remote ends thereof. Similarly, the ends of heads 13, 15 which are joined together when coupling 11 is in said attached condition are herein referred to as the proximal ends of heads 13, 15, whereas the opposite ends of the heads 13, 15 are referred to as the remote or distal ends thereof.

Body means 21 additionally includes a passageway 27 communicating inlet 23 with outlet 25 when coupling 11 is in said attached condition for providing a passage for the flow of liquid through coupling 11, as for example, along the pathway shown as at 29. Passageway 27 includes a first passage portion 31 in first head 13 and a second passage portion 33 in second head 15.

Heads 13, 15 respectively include openings 35, 37 in the respective opposite ends thereof from inlet 23 and outlet 25 (i.e., at the proximal ends of heads 13,15). Openings 35, 37 are joined together along the plane shown as at 39 when coupling 11 is in said intermediate and said attached conditions to provide an intermediate portion 41 of passageway 27.

Figure 3:
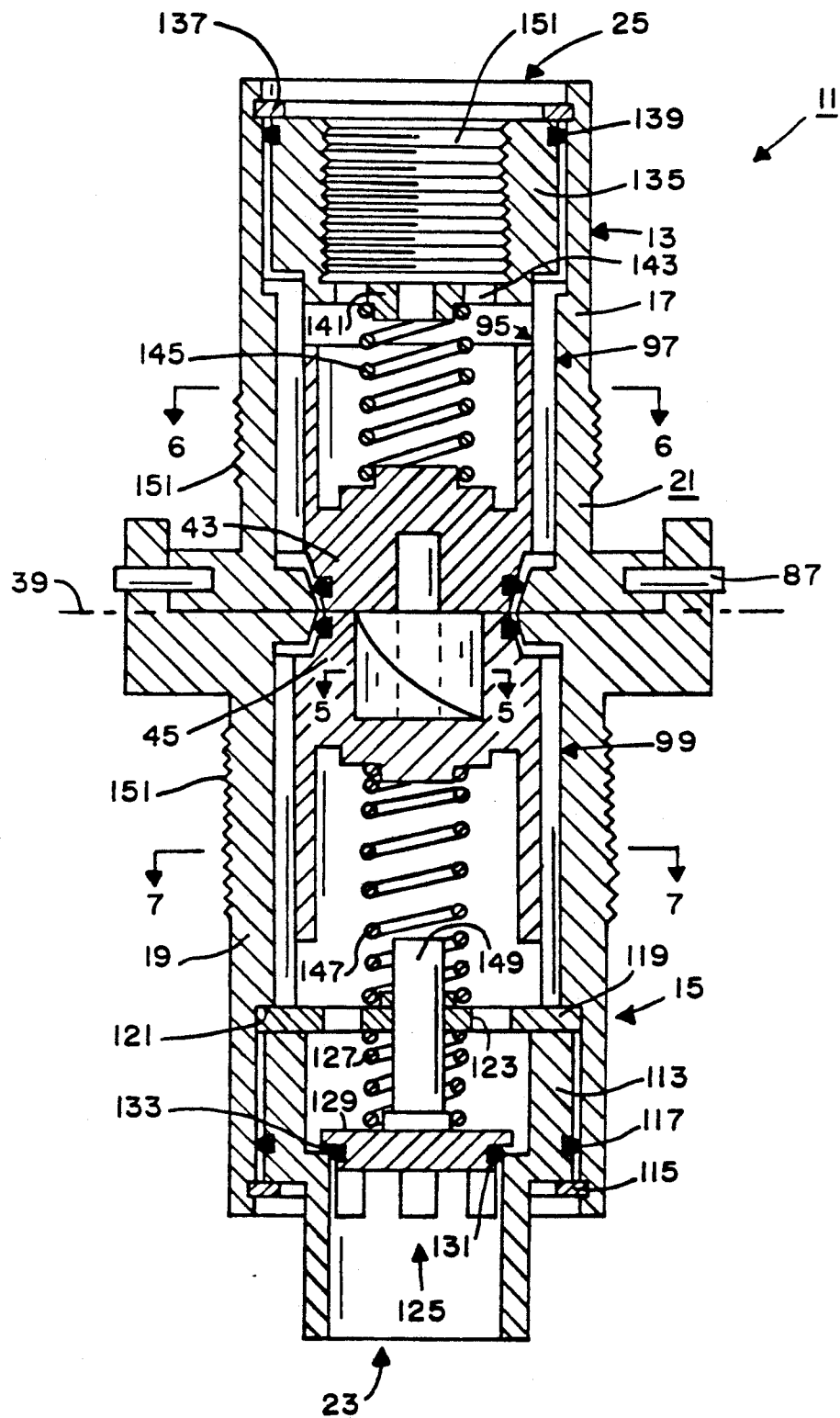
Figure 9:
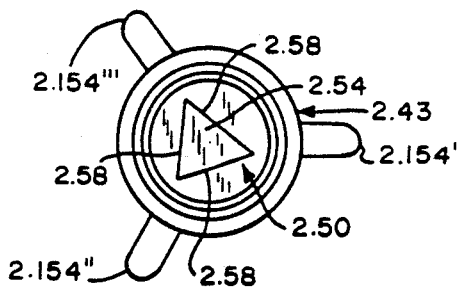
FIG. 9 is an end view of one of the mating means of the coupling of FIG. 8 taken as on the line 9—9 of FIG. 8.
Figure 10:
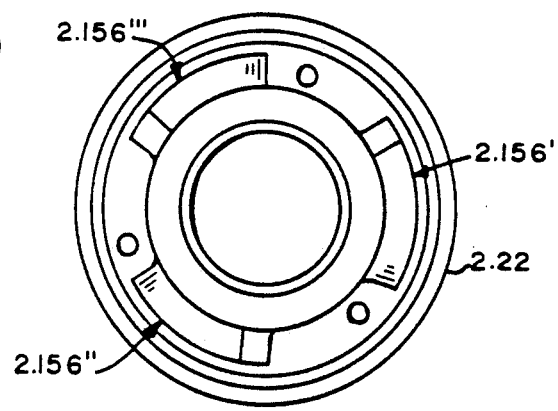
FIG. 10 is a top plan view of a portion of one of the head means of the coupling of FIG. 8 taken as on the line 10—10 of FIG. 8.
Figure 11:
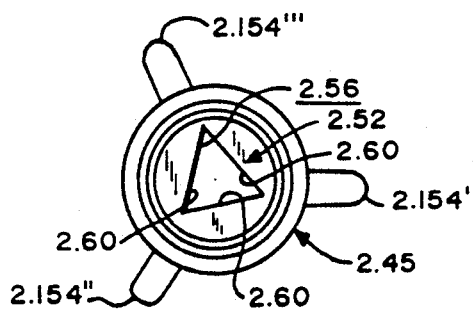
FIG. 11 is a top plan view of the other of the mating means of the coupling of FIG. 8 taken as on the line 11—11 of FIG. 8.
Figure 12:
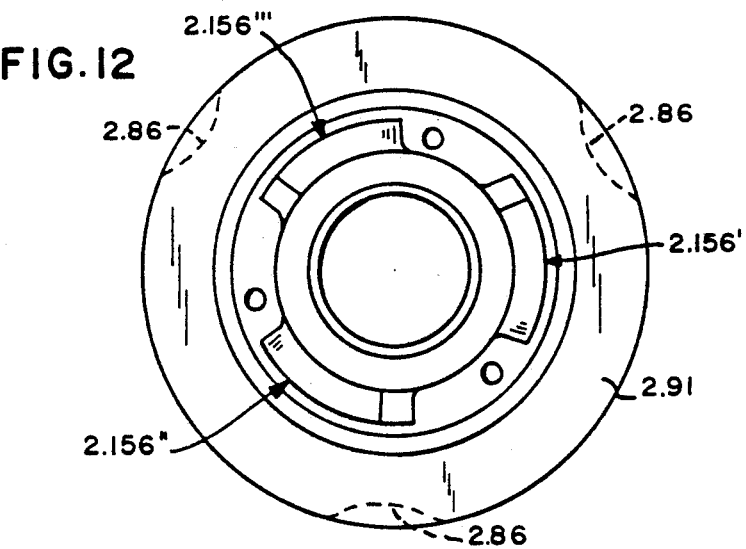
FIG. 12 is a bottom view of a portion of the head means of the coupling of FIG. 8 taken as on the line 12—12 of FIG. 8.

Heads 13, 15 respectively include coacting mating means 43, 45 respectively provided on the heads 13, 15 movable between an open position for providing a space therebetween forming an open part of passageway 27 for liquid flow when coupling 11 is in said coupling attached condition shown in FIG. 2 and a closed position for closing off the flow of liquid from heads 13, 15 when coupling 11 is in said coupling detached condition shown in FIG. 1 and in said coupling intermediate condition shown in FIG. 3.

Mating means 43, 45 respectively have end faces 47, 49 opposing one another and abutting one another along plane 39 when mating means 43, 45 are in said closed position. Mating means 43, 45 respectively include mating surface means or cam means 51, 53 for moving mating means 43, 45 in opposite directions away from one another towards said open position when mating means 43, 45 are engaged and turned in one direction relative to one another and for permitting movement of mating means 43, 45 towards one another when mating means 43, 45 are engaged and turned in the opposite direction relative to one another. Also, mating means 43 includes a projection 55 and mating means 45 includes a socket 57 adapted to receive projection 55.

Mating surface means 51 is preferably in the form of a pair of helixes 59, 61 projecting towards socket 57 from end face 47. Mating surface means 53 is preferably in the form of a pair of helixes 63, 65 which form the surface of socket 57 and which are complementarily shaped relative to helixes 59, 61 so that when the mating means 43, 56 are in said closed position shown in FIG. 3, all of the space in socket 57 is completely occupied by the helixes 59, 61 except for a cylindrical space 67 between the helixes 61, 65. This space 67 extends in a longitudinal direction relative to coupling 11 (i.e., along the longitudinal axis thereof) centrally of socket 57 from the top to the bottom thereof and forms a part of mating surface means 53. Mating surface means 51 includes a post 69 centrally thereof between helixes 59, 61. Post 69 is fixedly attached to mating means 43 by suitable means now known to those skilled in the art and extends in a longitudinal direction relative to coupling 11 (i.e., along the longitudinal axis thereof). Post 69 and cylindrical space 67 are complementarily shaped for sliding reception of post 69 by cylindrical space 67 so that when mating means 43, 45 are in said closed position shown in FIG. 3 the space in socket 57 is completely occupied by mating surface means 51 and intermediate portion 41 is completely blocked off whereby any waste fluid previously in socket 57 and intermediate portion 41 is expelled therefrom and caused by flow back into passage portion 31 and/or 33.

The inner wall 73 of opening 35 is preferably frustoconical in shape. Likewise, the outer wall 75 of the end of mating means 43 is frustoconical and shaped to closely slidably fit against inner wall 73. Also, a suitable O-ring seal 77, well known to those skilled in the art, is provided on outer wall 75 to engage inner wall 73 and seal off any flow from the end of first head 13 when the heads 13, 15 are detached.

Similarly, the inner wall 79 of opening 37 is preferably frustoconical in shape. Likewise, the outer wall 81 of the end of mating means 45 is frustoconical and shaped to closely slidably fit against inner wall 79. Also, a suitable O-ring seal 83, well known to those skilled in the art, is provided on outer wall 81 to engage inner wall 79 and seal off any flow from the end of second head 15 when the heads 13, 15 are detached.

Coupling 11 includes latching means 85 for coacting between head 13, 15 and for selectively being movable to an unlatched position wherein heads 13, 15 are in said detached condition of coupling 11, to an intermediate position shown in FIG. 3 and to a latched position shown in FIG. 2 for providing said attached condition of coupling 11. Latching means 85 preferably includes a pair of pins 87 attached to one of head body members 17, 19 and extending radially outwardly therefrom in opposition directions and a pair of circumferential slots 89 extending circumferentially about a portion of the circumference of the other of the head body members 17, 19. In the drawings, the pins 87 are shown attached to first head body member 17 and circumferential slots 89 are shown in second head body member 19 but these positions may be reversed, if desired, without departing from the spirit and scope of the present invention.

With the arrangement shown in the drawings, the slots 89 extend through a skirt portion 91 of second head body member 19, and pins 87 are attached to head body member 17 adjacent the proximal end thereof. A pair of entrance slots 93 respectively extend from the distal or unattached end 94 of skirt portion 91 to circumferential slots 89 to provide an entrance for pins 87 to enter and exit circumferential slots 89 during movement of coupling 11 between said detached condition and said intermediate condition. Entrance slots 93 are respectively perpendicular to slots 89 and extend in a longitudinal direction relative to body means 21 (i.e., parallel to the longitudinal axis thereof) whereby movement of heads 13, 15 between said detached condition and said intermediate condition does not allow turning of heads 13, 15 relative to one another and mating means 43, 45 remain in said closed position until pins 87 move in circumferential slots 89, as will be better understood in the description to follow.

Guide means 95 is operably coupled between latching means 85 and mating means 43, 45 for turning mating means 43, 45 relative to one another when latching means 85 is moved between said intermediate position and said latched position, and for guiding mating means 43, 45 in directions extending away from and towards one another, and when latching means 85 is moved from said intermediate to said latched position mating means 43, 45 are moved into said open position.

Guide means 95 includes spline means 97 operably coupled between first head body member 17 and mating means 43, and spline means 99 operably coupled between head body member 19 and mating means 45. Spline means 97 preferably includes a pair of splines 101 attached to first head body member 17 and respectively slidably received in a pair of slots 103 provided in a pair of spaced apart leg portions 105 of mating means 43. It will be understood that the spacing of mating means 43 from body member 17 between one pair of leg portions 105 to the other pair of leg portions 105 provides a path for the flow of liquid when mating means 43, 45 are in said open position. Similarly, spline means 99 preferably includes a pair of splines 107 attached to second head body member 19 and respectively slidably received in a pair of slots 109 provided in a pair of spaced apart leg portions 111 of mating means 45. It will be understood that the spacing of mating means 45 from body member 19 between one pair of leg portions 111 to the other pair of leg portions 111 provides a path for the flow of liquid when mating means 43, 45 are in said open position. The construction of spline means 97, 99 is well known to those skilled in the art and permits movement of mating means 43, 45 lengthwise of body means 21 in a direction towards and away from inlet 23 and outlet 25 but limits turning movement of mating means 43 relative to first head body member 17 and limits turning movement of mating means 45 relative to second head body member 19.

Inlet 23 is of any suitable construction now known to those skilled in the art and preferably includes an inlet portion insert 113 which is retained in second head body member 19 by a retainer ring 115 or the like and a suitable O-ring 117 seals the inlet port insert 113 against the second head body member 19. A disk member 119 is seated against shoulder 121 in second head body member 19 and engages the end of inlet port insert 113 and is thereby held in a fixed position relative to second head body member 19. Disk member 119 has openings 123 therethrough to allow passage of fluid.

A one way check valve means 125, now well known to those skilled in the art, is provided in inlet portion insert 113 for preventing flow of liquid out inlet 23 from passageway 27, but permits flow towards outlet 25 when mating means 43, 45 are in said open position. Check valve means 125 includes a spring 127 extending between disk member 119 and the base portion 129 of check valve means 125 to urge check valve means into a closed position shown in FIG. 3 wherein an O-ring 131 of the check valve means seats against a shoulder 133 to seal off the flow through check valve means 125 when the check valve means is in the position shown in FIG. 3.

Outlet 25 is of any suitable construction now known to those skilled in the art and preferably includes an outlet port insert 135 which is retained in first head body member 17 by a retainer ring 137 or the like and a suitable O-ring 139 seals the outlet port insert 135 against the first head body member 17. Outlet port insert 135 includes an end 141, which is provided with openings 143 for passage of liquid from passageway 27 out through outlet 25. A spring 145 extends between end 141 and mating means 43 and a spring 147 extends between disc member 119 and mating means 45 for urging mating means 43, 45 towards one another to move the mating means into said closed position in which the fluid flow is closed off as heretofore described when latching means 85 is moved from said latched position to said intermediate position.

Mating means 43 is limited in its movement towards outlet 25 by engagement of leg portions 105 with outlet port insert 135 and mating means 45 is limited in its movement towards inlet 23 by engagement of mating means 45 with disk member 119.

Suitable means well known to those skilled in the art is provided for attaching desired devices, not shown, such as fluid lines, pumps, tanks, etc. to the coupling 11. For example, suitable threads such as threads 151 may be provided as desired.

The operation of the coupling 11 is as follows:

Assume for the purpose of illustration that first head 13 and second head 15 have suitable lines or the like respectively coupled to the inlet 23 and outlet 25 and that coupling 11 is in said detached condition in which case openings 35, 37 are closed respectively by mating means 43, 45. Assuming further that it is desired then to attach first head 13 and second head 15, the first head 13 is moved towards second head 15 with pins 87 being aligned with entrance slots 93. Movement of heads 13, 15 is continued to cause pins 87 to respectively move through the entrance (s10H slots 92 until the pins stop against the bottom wall of circumferential slot 89. At this point, the parts will be in the position shown in FIG. 3 wherein the projection 55 is bottomed out in the socket 57 and pins 87 are respectively in alignment with circumferential slots 89. Next, heads 13, 15 are turned approximately ¼ turn relative to one another in opposite directions about the axis of coupling 11 to cause relative movement of pins 87 through the circumferential slots 89 until coupling 11 is in a coupling attached condition. It will be understood that when the coupling 11 is moved from said intermediate condition to said attached condition, mating means 43, 45 will turn relative to one another causing the mating means 43, 45 to move in opposite directions away from one another towards said open position shown in FIG. 2 for providing a space therebetween forming an open part of passageway 27 whereupon fluid is allowed to flow through the coupling 11, assuming of course that the pressure differential below and above the check valve means 125 is sufficient to open the check valve means. It will further be understood that when mating means 43, 45 are turned as above described the mating surface means 51, 53 are in sliding contact against one another and act as cam means to cause mating means 43, 45 to be urged endwise in opposite directions, i.e., respectively towards outlet 25 and inlet 23.

In moving from the coupling attached condition to the coupling detached condition, substantially the reverse of the above described operation is accomplished. It should be pointed out that when the parts assume the position shown in FIG. 3, i.e., the intermediate position, all flow of fluid through coupling 11 will have been stopped and all waste or excess fluid will have been forced back into heads 13 and/or 15 before the movement is made from said intermediate condition to said detached condition, i.e., before pins 87 are moved upwardly through the entrance slots 93, thereby assuring that there is substantially no fluid to drip from first and second heads 13, 15 during and after the detaching operation.

A second embodiment of the coupling of the present invention is shown in FIGS. 8-16 and identified by the numeral 2.11. Coupling 2.11 includes in general a first head 2.13 and a second head 2.15.

Figure 14:
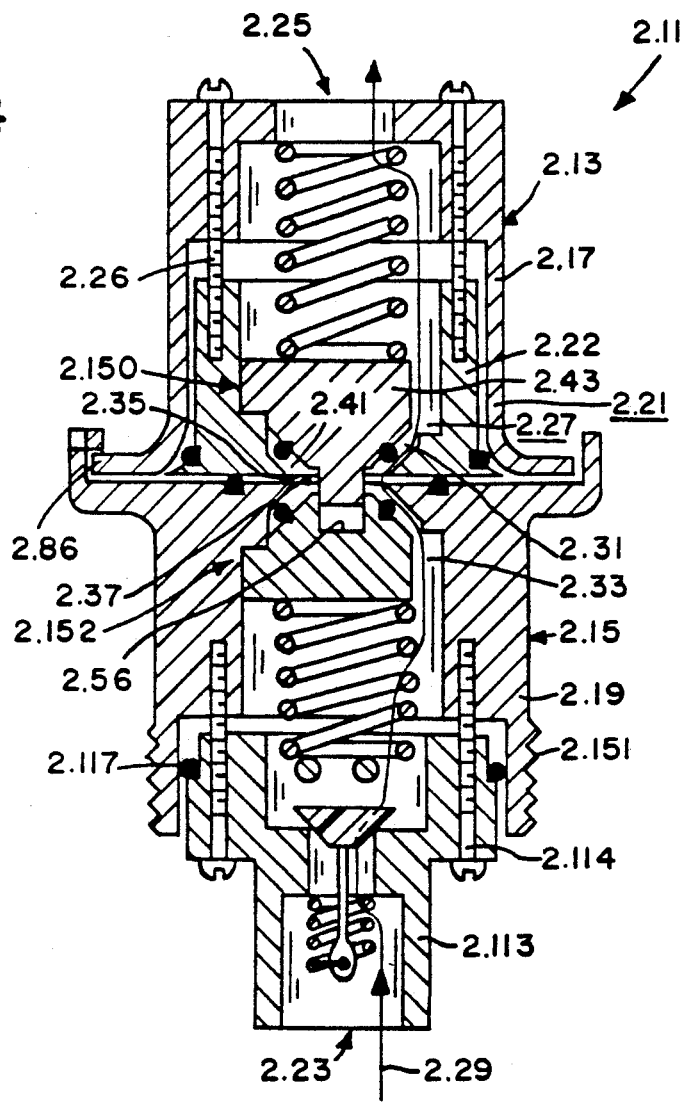
FIG. 14 is a view similar to FIG. 13 and showing the coupling of FIG. 8 in an attached condition of the coupling.
Figure 15:
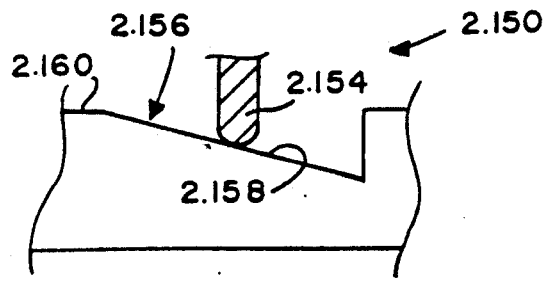
FIG. 15 is a somewhat diagrammatic view of one of the cam means of the coupling of FIG. 8.

Coupling 2.11 is operable between a coupling detached condition, not shown, in which heads 2.13, 2.15 are detached from one another and an attached condition shown in FIG. 14 in which heads 2.13, 2.15 are coupled together.

Heads 2.13, 2.15 respectively include body members 2.17, 2.19 which, when coupling 2.11 is in said attached condition, establishes body means 2.21. Body member 2.17 includes an insert portion 2.22. Body means 2.21 has an inlet 2.23 at one end thereof (i.e., the remote end of head 2.15) and an outlet 2.25 at the opposite end thereof (i.e., the remote end of head 2.13). Screws 2.26 hold insert portion 2.22 and the remainder of body member 2.13 together.

It will be understood that for the sake of clarity the ends of body members 2.17, 1.19 which are joined together when coupling 2.11 is in said attached condition are herein referred to as the proximal ends of body members 2.17, 2.19, whereas the opposite ends of the body members are referred to as the remote ends thereof. Similarly, the ends of heads 2.13, 2.15 which are joined together when coupling 2.11 is in said attached condition are herein referred to as the proximal ends of heads 2.13, 2.15, whereas the opposite ends of the heads 2.13, 21.5 are referred to as the remote or distal ends thereof.

Body means 2.21 additionally includes a passageway 2.27 communicating inlet 2.23 with outlet 2.25 when coupling 2.11 is in said attached condition for providing a passage for the flow of liquid through coupling 2.11, as for example, along the pathway shown as at 2.29. Passageway 2.27 includes a first passage portion 2.31 in first head 2.13 and a second passage portion 2.33 in second head 2.15.

Heads 2.13, 2.15 respectively include openings 2.35, 2.37 in the respective opposite ends thereof from inlet 2.23 and outlet 2.25 (i.e., at the proximal ends of heads 2.13, 2.15). Opening 2.35, 2.37 are adjacent one another when coupling 2.11 is in said intermediate and said attached conditions to provide an intermediate portion 2.41 of passageway 2.27.

Heads 2.13, 2.15 respectively include coacting mating means 2.43, 2.45 respectively provided in the heads 2.13, 2.15 movable between an open position for providing a space therebetween forming an open part of passageway 2.27 for liquid flow when coupling 2.11 is in said coupling attached condition shown in FIG. 14 and a closed position for closing off the flow of liquid from heads 2.13, 2.15 when coupling 2.11 is in said coupling detached condition and in said coupling intermediate condition shown in FIG. 13.

Mating means 2.43, 2.45 respectively have end faces 2.47, 2.49 opposing one another and abutting one another when mating means 2.43, 2.45 are in said closed position. Cam means, which will be described in detail later in the specification, are operably provided between body member 2.17 and mating means 2.43, and between body member 2.19 and mating means 2.45.

Also, a pair of cooperating connecting means 2.50, 2.52 are respectively provided on mating means 2.43, 2.45. Connecting means 2.50 is preferably in the form of a protrusion 2.54 and connecting means 2.52 is preferably in the form of a socket 2.56 in mating means 2.45. Socket 2.56 is complementarily shaped relative to protrusion 2.54 and adapted to slidably receive protrusion 2.54. Protrusion 2.54 and socket 2.56 are shaped so that when connecting means 2.50, 2.52 are connected, i.e., when protrusion 2.54 extends into socket 2.56, heads 2.13, 2.15 are connected so that heads 2.13, 2.15 cannot turn relative to one another but relative movement towards and away from one another is permitted. Preferably, protrusion 2.54 and socket 2.56 are respectively triangular in cross section with the three sides 2.58 or protrusion 2.54 forming an equilateral triangle and the three side 2.60 of socket 2.56 also forming an equilateral triangle. When heads 2.13, 2.15 are in said closed condition shown in FIG. 13 the space in socket 2.56 is completely occupied by protrusion 2.54 and intermediate portion 2.41 is completely blocked off whereby any waste fluid previously in socket 2.56 and intermediate portion 2.41 is expelled therefrom and caused to flow back into passage portion 2.31 and/or 2.33.

The inner wall 2.73 of opening 2.35 is preferably frustoconical in shape. Likewise, the outer wall 2.75 of the end of mating means 2.43 is frustoconical and shaped to fit against inner wall 2.73. Also, a suitable O-ring seal 2.77, well known to those skilled in the art, is provided on outer wall 2.75 to engage inner wall 2.73 and seal off any flow from the end of first head 2.13 when the heads 2.13, 2.15 are detached.

Similarly, the inner wall 2.79 of opening 2.37 is preferably frustoconical in shape. Likewise, the outer wall 2.81 of the end of mating means 2.45 is frustoconical and shaped to fit against inner wall 2.79. Also, a suitable O-ring seal 2.83, well known to those skilled in the art, is provided on outer wall 2.81 to engage inner wall 2.79 and seal off any flow from the end of second head 2.15 when the heads 2.13, 2.15 are detached.

Coupling 2.11 includes latching means 2.84 for coacting between heads 2.13, 2.15 and for selectively being movable to an unlatched position wherein heads 2.13, 2.15 are in a detached condition of coupling 2.11, to an intermediate position shown in FIG. 13 and to a latched position shown in FIG. 14 for providing said attached condition of coupling 2.11. Latching means 2.84 preferably includes a plurality (preferably, 3 in number) of lips 2.86 attached to one of head body members 2.17, 2.19 and extending radially inwardly therefrom at 120 degree spaced intervals and an equal number of corresponding indentations 2.88 spaced around the other of the head body members 2.17, 2.19 at 120 degree spaced intervals. In the drawings, the indentations 2.88 are shown in the first head body member 2.17 and lips 2.86 are shown attached to second head body member 2.19, but these positions may be reversed, if desired, without departing from the spirit and scope of the present invention. Also, if desired, the latching means 85 of the first embodiment may be utilized in place of latching means 2.84 without departing from the spirit and scope of the present invention.

More specifically, with the arrangement shown in the drawings of coupling 2.11, the indentations 2.88 are provided in a skirt portion 2.90 of first head body member 2.17, and lips 2.86 are fixedly and integrally attached to a skirt portion 2.91 of second head body member 2.19 adjacent the proximal end of second head 2.15. Each of lips 2.86 are preferably provided by deforming the metal at the upper edge of skirt 2.91 to establish the inwardly arcuate lip, which will split away from the other portion of the skirt 2.91 along the line 2.92 in a manner well known to those skilled in the art. There is a stop 2.93 is provided on skirt portion 2.90 for engaging one of lips 2.86 to stop the turning of first head body member 2.17 and second head body member 2.19 relative to one another when latching means 2.84 is in said latched position wherein coupling 2.11 is in said attached condition.

Inlet 2.23 is of any suitable construction now known to those skilled in the art and preferably includes an inlet portion insert 2.113 which is retained in second head body member 2.19 by a screws 2.114 or the like and a suitable O-ring 2.117 seals the inlet port insert 2.113 against the second head body member 2.19.

A one way check valve means 2.125, now well known to those skilled in the art, is provided in inlet port insert 2.113 for preventing flow of liquid out inlet 2.23 from passageway 2.27, but permits flow towards outlet 2.25 from mating means 2.43, 2.45 are in said open position. Check valve means 2.125 includes a spring 2.127 extending between the distal end of a stem 2.128 of check valve means 2.125 and a shoulder 2.130 in inlet port insert 2.113 to urge check valve means into a closed position in FIG. 13 wherein check valve means 2.125 seats against a shoulder 2.133 to seal off the flow through check valve means 2.125 when the check valve means is in the position shown in FIG. 13.

An O-ring 2.132 is provided between insert portion 2.22 and the other part of first head body member 2.17 adjacent the proximal ends thereof to block off flow of fluid out the proximal end of the first head body member. Also, an O-ring 2.134 is provided in the proximal face 2.136 of second head body member 2.19 and the proximal face 2.138 of insert portion 2.22 to prevent flow of fluid outwardly from the space 2.41 when latching means 2.84 is in said intermediate position, said latched position, and positions therebetween.

A spring 2.145 extends between a shoulder 2.146 on body member 2.17 and mating means 2.43, and a spring 2.147 extends between mating means 2.45 and spring retainers 2.148 fixedly provided in inlet port insert 2.113 for urging mating means 2.43, 2.45 towards one another to move the mating means into said closed position in which the fluid flow is closed off as heretofore described when latching means 2.84 is moved from said latched position to said intermediate position.

In general, the principal differences between the first and second embodiments of the couplings 11 and 2.11 of the present invention relate to the actuating means for moving the mating means in opposite directions away from one another when the pair of mating means are engaged and the first and second heads are turned in opposite directions relative to one another. In coupling 11 the actuating means includes cam means 51, 53 respectively provided on mating means 43, 45, and guide means 95; whereas in general in coupling 2.11 the actuating means includes cam means 2.150 operably coupled between first head 2.13 and mating means 2.43 and cam means 2.152 operably coupled between second head 2.15 and mating means 2.45, and the pair of cooperating connecting means 2.50, 2.52 respectively provided on first head 2.13 and second head 2.15.

There are preferably three sets of cam means 2.150 and three sets of cam means 2.152 respectively spaced from and equiangularly spaced around the longitudinal centerline of coupling 2.11. Each of the cam means 2.150, 2.152 is preferably identical and the following description of one of cam means 2.150 will suffice for all. Cam means 2.150 includes a cam follower 2.154 and a cam surface 2.156. Cam followers 2.154 is fixedly attached to mating means 2.43 and extends radially outwardly therefrom. Cam surface 2.156 is fixedly mounted on first head 2.13, preferably by being provided on insert portion 2.22 of first head body member 2.13, i.e., being formed as a part of the surface of the insert portion 2.22, and is engaged by cam follower 2.,154. Cam surface 2.156 includes a sloping portion 2.158 and a shoulder portion 2.160. For clarity the three sets of cam means 2.150 and the parts thereof are respectively designated by a single prime mark, a double prime mark, and a triple prime mark. Similarly, the corresponding parts of the three sets of cam means 2.152 are so designated. It will be understood that cam surfaces 2.156', 2.156", and 2.156" of the respective cam means 2.150', 2.150", and 2.150'" are provided on insert portion 2.22 and cam surfaces 2.156', 2.156", and 2.156'" of the respective cam means 2.152', 2.152", and 2.152'" are provided on second head body member 2.19. Also, it will be understood that cam followers 2.154', 2.154", and 2.154'" of the respective cam means 2.150', 2.150", and 2.150'" are fixedly attached to mating means 2.43 in equiangular relationship and extend outwardly therefrom, and similarly cam followers 2.154', 2.154", and 2.154'" of the respective cam means 2.152', 2.152", and 2.152'" are fixedly attached to mating means 2.45 in equiangular relationship and extend outwardly therefrom.

Suitable means well known to those skilled in the art is provided for attaching desired devices, now shown, such as fluid lines, pumps, tanks, etc. to the coupling 2.11. For example, suitable threads such as threads 2.151 may be provided as desired.

The operation of the coupling 2.11 is as follows:

Assume for the purpose of illustration that first head 2.13 and second head 2.15 have suitable lines or the like respectively coupled to the inlet 2.23 and outlet 2.25 and that coupling 2.11 is in said detached condition in which case openings 2.35, 2.37 are closed respectively by mating means 2.43, 2.45. Assuming further that it is desired then to attach first head 2.13 and second head 2.15, the first head 2.13 is moved toward second head 2.15 with indentations 2.88 being aligned with lips 2.86 (see FIG. 16). Movement of heads 2.13, 2.15 is continued to cause skirt portion 2.90 of first head 2.13 to move past lips 2.86 to the intermediate position of latching means 2.84. At this point, the parts will be in the position shown in FIG. 13 wherein the protrusion 2.54 is bottomed out in the socket 2.56. Next, heads 2.13, 2.15 are turned approximately ¼ turn relative to one another in opposite directions about the axis of coupling 2.11 to cause the non indented edge portions of skirt portion 2.90 to move beneath lips 2.86 until the coupling 2.11 is in said attached condition (see FIG. 14) which will occur when stop 2.93 abuts one of the lips 2.86. It will be understood that when the coupling 2.11 is moved from said intermediate condition to said attached condition, mating means 2.43, 2.45 will not turn relative to one another due to the engagement of connecting means 2.50, 2.52, but due to the action of cam means 2.150, 2.152 mating means 2.42, 2.45 will move in opposite directions away from one another towards said open position shown in FIG. 14 for providing a space therebetween forming an open part of passageway 2.27 whereupon fluid is allowed to flow through the coupling 2.11, assuming of course that the pressure differential below and above the check valve means 2.125 is sufficient to open the check valve means. It will further be understood that when first head 2.13 and second head 2.15 are turned as above described the cam follower 2.154 will move relative to cam surface 2.156 and cause relative sliding movement of the cam follower up sloping surface 2.158 and onto shoulder portion 2.160 whereupon mating means 2.43, 2.45 will be in said open position shown in FIG. 14.

In moving from the coupling attached condition to the coupling detached condition, substantially the reverse of the above described operation is accomplished. It should be pointed out that when the parts assume the position shown in FIG. 13, i.e., the intermediate position, all flow of fluid through coupling 2.11 will have been stopped and all waste or excess fluid will have been forced back into heads 2.13 and/or 2.15 before the movement is made from said intermediate condition to said detached condition, i.e., before skirt 2.90 is moved upwardly past lips 2.86, thereby assuring that there is substantially no fluid to drip from first and second heads 2.13, 2.15 during and after the detaching operation.

It will be understood that in the drawings the spaces between the various parts having O-rings therebetween have been exaggerated for purposes of clarity, but in practice the spaces preferably will be narrower, as for example, due to the squeezing down of the O-rings under pressure.

Although the present invention has been described and illustrated with respect to a preferred embodiment and a preferred use therefor, it is not to be so limited since modifications and changes can be made therein which are within the full intended scope of the invention.

I claim:

1. A detachable coupling operable between a latched state and an unlatched state, having an intermediate state between the latched state and the unlatched state, the coupling comprising:
    a pair of coupling heads, each coupling head having a passage for the flow of liquid through the coupling, the passages being in fluid communication with one another;
    coacting mating means on each coupling head, each mating means movable between an open position for providing a space between the mating means thereby forming part of the coupling head passage and a closed position for stopping the flow of liquid when the coupling is in the unlatched state;
    a means for controlling the flow of liquid through the coupling head passage;
    a means for latching the coupling heads together;
    a means for expelling any liquid from any space between the coupling heads, the liquid being expelled into the coupling heads when the coupling is operated from the latched state to the intermediate state, the means for expelling including a pair of cooperating connectors provided on the mating means for selectively connecting the mating means together for limiting turning movement of the mating means relative to one another but permitting relative movement towards and away from one another, one of the connectors being a socket and the other of the connectors being a protrusion, the socket and protrusion having complementary shapes and sizes whereby, the means for expelling liquid completely occupies any remaining space between the pair of mating means when the pair of mating means is in the closed position so that when the detachable coupling is unlatched, there is substantially no drip of liquid from the coupling; and
    a means for biasing the means for controlling the flow of liquid towards a closed position thereby stopping the flow of liquid when the coupling is operated from the latched state to the unlatched state.

2. The detachable coupling according to claim 1 further comprising:
    a seal coacting between the mating means and the coupling head passage.

3. The detachable coupling according to claim 1 further comprising:
    a check valve in one of the coupling heads.

4. The detachable coupling according to claim 1 wherein the means for controlling flow includes a set of cams, each of the cams including a cam surface fixedly mounted on a coupling head and a cam follower fixedly mounted on a mating means and engaging the cam surface, a set of cams being mounted on each coupling head.

5. The detachable coupling according to claim 4 wherein each of the cam surfaces of the sets of cams includes a sloping portion for engaging one of the cam followers to cam the mating means away from one another, and a flat portion for retaining the mating means in the open position.

6. The detachable coupling according to claim 1 wherein the means for biasing comprising a spring.

7. The detachable coupling according to claim 6 wherein the spring is located in the coupling head passage and a major portion of the flow of liquid through the coupling head passage is on the outside of the spring.

8. A detachable coupling operable between a latched state and an unlatched state, having an intermediate state between the latched state and the unlatched state, the coupling comprising:
    a pair of coupling heads, each coupling head having a passage for the flow of liquid through the coupling, the passages being in fluid communication with one another;
    coacting mating means on each coupling head, each mating means movable between an open position for providing a space between the mating means thereby forming part of the coupling head passage and a closed position for stopping the flow of liquid when the coupling is in the unlatched state;
    a pair of cooperating connectors provided on the mating means for selectively connecting the mating means together for limiting turning movement of the mating means together for another but permitting relative movement towards and away from one another;

a means for latching the coupling heads together;

a means for controlling the flow of liquid through the coupling head passage, the means for controlling the flow of liquid being located in each coupling head and including at least one cooperating cam operably coupled between one coupling head and one of the mating means and at least one other cooperating cam operably coupled between the other coupling head and the other of the mating means, each cooperating cam including a cam surface and a cam follower;

a means for respectively turning the cam surfaces relative to the cam followers;

a means for expelling any liquid from any space between the coupling heads, the liquid being expelled into the coupling heads when the coupling is operated from the latched state to the intermediate state, the means for expelling liquid completely occupying any remaining space between the pair of mating means when the pair of mating means is in the closed position whereby when the detachable coupling is unlatched, there is substantially no drip of liquid from the coupling; and a means for biasing the means for controlling the flow of liquid towards a closed position thereby stopping the flow of liquid when the coupling is operated from the latched state to the unlatched state.

9. The detachable coupling according to claim 8 further comprising:

a check valve in one of the coupling heads.

10. The detachable coupling according to claim 1 further comprising:

a seal coating between the mating means and the coupling head passage.

11. The detachable coupling according to claim 8 further comprising:

a socket on one of the connectors and a protrusion on the other of the connectors, the socket and the protrusion having complementary shapes.

12. The detachable coupling according to claim 11 wherein the protrusion completely occupies the socket when the coupling is in the intermediate state whereby any waste fluid previously in the socket is expelled therefrom and the protrusion partially occupies the socket when the coupling is in the latched state and prevents any fluid from entering the socket.

13. The detachable coupling according to claim 8 wherein the means for controlling flow includes a first set of cams and a second set of cams, each of the cams of the first set including a first cam surface fixedly mounted on one of the coupling heads and a first cam follower fixedly mounted on one of the mating means and engaging the first cam surface, and each of the cams of the second set including a second cam surface fixedly mounted on the other of the coupling heads and a second cam follower fixedly mounted on the other of the mating means and engaging the second cam surface.

14. The detachable coupling according to claim 13 wherein each of the cam surfaces of the first and second sets of cams includes a sloping portion for engaging one of the cam followers to cam the mating means away from one another, and a flat portion for retaining the mating means in the open position.

15. The detachable coupling according to claim 8 wherein the means for biasing comprises a spring.

16. The detachable coupling according to claim 15 wherein the spring is located in the coupling head passage and a major portion of the flow of liquid through the coupling head passage is on the outside of the spring.

* * * * *

UNITED STATES PATENT AND TRADEMARK OFFICE
CERTIFICATE OF CORRECTION

PATENT NO. : 5,168,897
DATED : December 3, 1992
INVENTOR(S) : John A. Vanderjagt It is certified that error appears in the above-indentified patent and that said Letters Patent is hereby corrected as shown below:

Column 12, claim 8, line 68, delete "together for" and replace with-- relative to one--.

Column 13, claim 10, line 34, delete "1" and replace with -- 8 --.

Signed and Sealed this

Nineteenth Day of October, 1993

Attest:

BRUCE LEHMAN

*Attesting Officer*     *Commissioner of Patents and Trademarks*